US012551258B1

(12) United States Patent
Ghaffari et al.

(10) Patent No.: US 12,551,258 B1
(45) Date of Patent: Feb. 17, 2026

(54) MEDIAL BRANCH SMART TIP NEEDLE

(71) Applicant: Pacira CryoTech, Inc., Tampa, FL (US)

(72) Inventors: Mahsa Ghaffari, San Diego, CA (US); Amir Haas, Irvine, CA (US); Raymond Parfett, Cincinnati, OH (US); Brandon Phung, Poway, CA (US); Briana Rieman, San Diego, CA (US); Jonathan Slonin, Palm City, FL (US); John Spranger, Stowe, VT (US); John Christopher Toomey, Carlsbad, CA (US)

(73) Assignee: Pacira CryoTech, Inc., Tampa, FL (US)

( * ) Notice: Subject to any disclaimer, the term of this patent is extended or adjusted under 35 U.S.C. 154(b) by 0 days.

(21) Appl. No.: 19/013,766

(22) Filed: Jan. 8, 2025

(51) Int. Cl.
*A61B 18/02* (2006.01)
*A61B 18/00* (2006.01)

(52) U.S. Cl.
CPC .... *A61B 18/02* (2013.01); *A61B 2018/00023* (2013.01); *A61B 2018/00077* (2013.01); *A61B 2018/0262* (2013.01)

(58) Field of Classification Search
None
See application file for complete search history.

(56) References Cited

U.S. PATENT DOCUMENTS 2,373,240 A    4/1945  Finch et al.
5,800,487 A *  9/1998  Mikus ..................... F25B 9/02
                                                 607/113
7,713,266 B2   5/2010  Elkins et al.
7,850,683 B2   12/2010 Elkins et al.
8,298,216 B2   10/2012 Burger et al.
8,461,108 B2   6/2013  Hsu et al.
(Continued)

FOREIGN PATENT DOCUMENTS

EP           2373240 B1      4/2015
KR    10-2011-0119640    *  11/2011
(Continued)

OTHER PUBLICATIONS

KR 10-2011-0119640-translation (Year: 2011).*
(Continued)

*Primary Examiner* — Manuel A Mendez
(74) *Attorney, Agent, or Firm* — Kilpatrick Townsend & Stockton LLP

(57) ABSTRACT

Cryogenic methods, systems, and devices cryogenic system for alleviating lower back pain in a patient. The cryogenic device includes a handpiece having a size and shape suitable for supporting in a hand of an operator and a needle probe coupled to a distal portion of the handpiece. The needle probe includes a probe body, at least one needle coupled the probe body, and a silica supply tube extending within the needle lumen. The system includes an introducer configured to receive and position the at least one needle proximate to a location of a target tissue associated with lower back pain, wherein the cryogenic device is configured to provide a desired ice ball shape that remains on a distal portion of the introducer after the at least one needle is removed therefrom. The system further includes a needle guard configured to house the needle probe.

14 Claims, 12 Drawing Sheets

(56) References Cited

U.S. PATENT DOCUMENTS

| | | | |
|---|---|---|---|
| 9,017,318 | B2 | 4/2015 | Fourkas et al. |
| 9,039,688 | B2 | 5/2015 | Palmer et al. |
| 9,066,712 | B2 | 6/2015 | Fourkas et al. |
| 9,072,498 | B2 | 7/2015 | Elkins et al. |
| 9,113,855 | B2 | 8/2015 | Burger et al. |
| 9,155,584 | B2 | 10/2015 | Fourkas et al. |
| 9,610,112 | B2 | 4/2017 | Karnik et al. |
| 10,085,789 | B2 | 10/2018 | Carnell et al. |
| 10,188,444 | B2 | 1/2019 | Fourkas et al. |
| 10,470,813 | B2 | 11/2019 | Allison et al. |
| 10,888,366 | B2 | 1/2021 | Allison |
| 10,939,947 | B2 | 3/2021 | Burger et al. |
| 11,272,972 | B2 | 3/2022 | Allison et al. |
| 11,672,595 | B1 * | 6/2023 | Melton .............. A61B 18/1477 606/41 |
| 11,690,661 | B2 | 7/2023 | Hinton et al. |
| 11,740,759 | B2 | 8/2023 | Johansson et al. |
| 11,779,383 | B2 | 10/2023 | Johansson |
| 11,857,239 | B2 | 1/2024 | Fourkas et al. |
| 11,865,038 | B2 | 1/2024 | Karnik et al. |
| 11,957,397 | B2 | 4/2024 | Huffmaster et al. |
| 12,076,069 | B2 | 9/2024 | Lee et al. |
| 12,167,881 | B2 | 12/2024 | Cross et al. |
| 12,178,746 | B2 | 12/2024 | Burger et al. |
| 2012/0265278 | A1 * | 10/2012 | Fourkas ................. A61B 18/02 607/104 |
| 2019/0038459 | A1 | 2/2019 | Karnik et al. |
| 2021/0161579 | A1 | 6/2021 | Huffmaster et al. |

FOREIGN PATENT DOCUMENTS

| | | | | |
|---|---|---|---|---|
| WO | WO-2009065061 | A1 * | 5/2009 | .............. A61F 7/00 |
| WO | WO-2014146122 | A1 * | 9/2014 | ............ A61B 18/02 |
| WO | 2019099677 | A1 | 5/2019 | |

OTHER PUBLICATIONS

"Pacira BioSciences Receives FDA 510k Clearance for New iovera° SmartTip to Manage Chronic Low Back Pain via Long-lasting Medial Branch Nerve Block", https://www.biospace.com/press-releases/pacira-biosciences-receives-fda-510k-clearance-for-new-iovera-smarttip-to-manage-chronic-low-back-pain-via-long-lasting-medial-branch-nerve- block, Jan. 7, 2025.

* cited by examiner

MEDIAL BRANCH SMART TIP NEEDLE

BACKGROUND

The present disclosure is generally directed to medical devices, systems, and methods for cryotherapy. More specifically, the present disclosure relates to cryogenically cooling target tissues of a patient so as to degenerate, inhibit, remodel, or otherwise affect a target tissue to achieve a desired change in its behavior or composition. Cryogenic cooling of neural tissues has been shown to be effective in treating a variety of indications including pain (e.g., occipital, and other neuralgias, neuromas, osteoarthritis), spasticity, and joint stiffness, among others. For example, cooling neural tissues has been found to degenerate or inhibit nerves that are instrumental in causing these conditions.

In light of the above, cryogenic devices with needle probes have emerged as a mode of therapeutically cooling target tissues for treating a variety of indications. The needle probes of such devices are typically inserted into a patient's skin adjacent to a target tissue. Some cryogenic devices may include a cryogen source such that cryogen may be either injected into the target tissue via openings in needles of their needle probes, such that the target tissue is cooled directly by the cryogen. Other cryogenic probes may include closed needle tips, in which case the needles may be cooled (e.g., by a flow of the cryogen), and the target tissue adjacent to the cooled needles may thereby be cooled by conduction. These cryogenic probes have proved to be effective in creating cryozones within a patient at or around target tissues with precision, convenience, and reliability.

SUMMARY

This disclosure of the present invention relates to improved cryogenic medical devices, systems, and methods. Many of the devices and systems described herein will be beneficial for cryotherapy of nerves associated with back pain. Various features and advantages of such cryogenic systems and methods are described herein.

According to an embodiment, a cryogenic device for treating a target tissue of a patient includes a handpiece having a size and shape suitable for supporting in a hand of an operator including at least one cooling fluid supply path disposed in the handpiece and a needle probe coupled to a distal portion of the handpiece. The needle probe includes a probe body, a blunt needle coupled to the probe body, the blunt needle having a proximal end, a distal end, and a needle lumen therebetween, and a silica supply tube extending within the needle lumen and coupled to the at least one cooling fluid supply path. In particular, the silica supply tube comprises an inner diameter and an outer diameter, wherein a ratio of the inner diameter to the outer diameter of the silica supply tube is configured to provide a desired ice ball shape. Advantageously, varying the diameters of the silica tubing and the ratio between the needle outer diameter and the needle inner diameter allows for a desired ice ball shape (e.g., teardrop shape) while avoiding undesirable ice ball shapes (e.g., round ice balls may be undesirable depending on the application) and/or needle frosting, especially when designing longer needles (e.g., 175-180 mm) with a reduced gauge size (e.g., 25G) for lower back pain and spinal indications. The desired ice ball shape is based at least in part on the approach of the needle and anatomical size of the targeted nerves. For example, it is desirable to ensure complete coverage of the nerves, thereby fully encapsulating them within the ice ball.

The cryogenic device may include various optional embodiments. The desired ice ball shape may be a teardrop shape. Such ice balls are uniquely suited for treating various conditions described herein. For example, various embodiments of the present disclosure may be applied for treatment of the medial branch and sacroiliac joints (SI joints). The ratio of the inner diameter to the outer diameter the silica supply tube is in a range between 0.44 and 0.52. A flow rate of cooling fluid is further configured to provide the desired ice ball shape at the distal end of the blunt needle. Flow rates are typically in a range between 4.70-8.34 SCCM (Standard cubic centimeters per minute).

A gauge of the blunt needle may be greater than or equal to 25 G. The blunt needle may have a length that is greater than or equal to 175 mm in length. In other embodiments, needle gauges and/or length may be less than those listed herein and used with larger and/or shorter introducer cannulas, respectively, to accommodate the needles.

The target tissue may include various nerves associated with lower back pain, such as a medial branch nerve. The target tissue may further include a sacroiliac joint. The target tissue may further include a basivertebral nerve.

According to various embodiments, at least a portion of the blunt needle is electrically conductive for performing neurostimulation and identifying the target tissue. The blunt needle may be free of a dielectric outer coating (e.g., parylene, PET, etc.) as it may be introduced proximate to the target tissue via a sharp straight or curved introducer (e.g., 18G-20G) that both positions the blunt needle and provides insulation when neurostimulation is performed. The device may further include a needle guard configured to house the needle probe including the blunt needle for patient safety, reducing biohazards, and/or maintaining an electrical connection with a nerve stimulator during a treatment procedure. The device may further include an access cover configured to seal internal ports of the cryogenic device for improved electrical safety and cybersecurity.

According to another embodiment, a cryogenic device for treating a target tissue of a patient includes a handpiece having a size and shape suitable for supporting in a hand of an operator including at least one cooling fluid supply path disposed in the handpiece and a needle probe coupled to a distal portion of the handpiece. The needle probe includes a probe body, a blunt needle coupled to the probe body, the blunt needle having a proximal end, a distal end, and a needle lumen therebetween. The blunt needle has a length greater than or equal to 175 mm and a gauge that is greater than or equal to 25 G and a silica supply tube extending within the needle lumen and coupled to the at least one cooling fluid supply path. The silica supply tube comprises an inner diameter and an outer diameter, wherein a ratio of the inner diameter to the outer diameter of the silica supply tube is configured to provide a desired teardrop ice ball (e.g., length of 15.5 mm and a width of 7.05 mm).

According to yet another embodiment, a cryogenic system for alleviating lower back pain in a patient includes a cryogenic device including a handpiece having a size and shape suitable for supporting in a hand of an operator and at least one cooling fluid supply path disposed in the handpiece and a needle probe coupled to a distal portion of the handpiece. The needle probe includes a probe body, at least one needle coupled the probe body, the at least one needle having a proximal end, a distal end, and a needle lumen therebetween, and a silica supply tube extending within the needle lumen and coupled to the at least one cooling fluid supply path. The system further includes an introducer configured to receive and position the at least one needle proximate to a location of a target tissue associated with lower back pain. The cryogenic device is configured to provide a desired ice ball that remains on a distal portion of the introducer after the at least one needle is removed therefrom.

According to various embodiments, the introducer is configured to minimize post cooling time by the cryogenic device by allowing the ice ball to remain and melt thereon. For example, a typical cryotherapy procedure total time (pre-cooling, cooling, and post-cooling) may be reduced by approximately 20 percent as compared to other cryotherapy regimens (e.g., 106 seconds to 86 seconds), where post cooling time may be reduced by over 50 percent as compared to other cryotherapy regimens (e.g., from 45 seconds to 15 seconds) as the introducer couples the ice ball until it melts while the health care professional is free to treat the next treatment location with the removed cryogenic device. Advantageously, this sequential process (e.g., treating a second treatment location while the introducer couples the ice ball at the first treatment location) aids in decreasing overall procedure treatment times by reducing post cooling time between treating a plurality of locations. The introducers may include a gauge size in a range between 15 G and 20 G, although larger introducer cannulas may be used to accommodate larger needle gauges.

The system may include various optional embodiments. The system may further include a needle guard configured to house the needle probe. The needle guard may be removably couplable from the needle probe via a gripping mechanism. The needle guard and the needle probe may be removably couplable from the handpiece while the needle guard and the needle probe remain coupled to each other via a coupling mechanism. The coupling mechanism may be disposed on an interior and exterior surface of the needle guard. Conveniently, the needle guard provided herein is configured for removal from the handpiece with or without being coupled with the needle probe, depending on the health care professional's preference, the stage of the procedure, etc.

According to various embodiments, the system may further include a nerve stimulator configured to be electrically coupled to the probe body of the needle probe. The needle guard is configured to house the at least one needle (e.g., via slotted feature) when a cable of the nerve stimulator is coupled to the needle probe. Accordingly, the healthcare professional is able to safely and easily move the needle probe during the procedure without having to disconnect or reconnect the electrical connection each time for nerve stimulation, which again reduces procedure time. During the nerve stimulation phase, the handpiece may not need to be connected to the needle probe. Furthermore, the healthcare professional is able to engage and disengage the needle guard while maintaining the electrical connection with the nerve stimulator. The needle guard may further include a slotted feature on the needle guard for receiving a connection for the cable of the nerve stimulator. The system may further include an access cover configured to seal internal ports of the cryogenic device. The access cover electrically isolates components of the cryogenic device from the treatment environment. The access cover further provides additional cybersecurity as it may require a specialized tool to remove the access cover and access internal ports of the cryogenic device.

According to at least some embodiments, the target tissue may include a medial branch nerve. The target tissue may include a basivertebral nerve. The target tissue may include a sacroiliac joint.

According to another embodiment, a method for treating lower back pain in a patient includes providing a cryogenic device including a handpiece having a size and shape suitable for supporting in a hand of an operator including at least one cooling fluid supply path disposed in the handpiece and a needle probe coupled to a distal portion of the handpiece. The needle probe includes a probe body, at least one needle coupled to the probe body, at least one needle having a proximal end, a distal end, and a needle lumen there between, and a silica supply tube extending within the needle lumen and coupled to the at least one cooling fluid supply path. The silica supply tube comprises an inner diameter and an outer diameter, wherein a ratio of the inner diameter to the outer diameter of the silica supply tube is configured to provide a desired ice ball. The method further includes identifying a location of a treatment zone with reference to a skin surface proximate to a target tissue associated with lower back pain, inserting the at least one needle of the cryogenic device via an introducer through the skin surface and to a first location of the treatment zone, and activating the cryogenic device such that the at least one needle creates the desired ice ball proximate to the target tissue, thereby eliminating or reducing a severity of pain. Advantageously, the at least one needle may be removed from the introducer at the first location of the treatment zone while the ice ball remains coupled to a distal portion of the introducer at the first location of the treatment zone until the ice ball melts.

The method may include various optional embodiments. The method may include prior to inserting the at least one needle of the cryogenic device via the introducer through the skin surface and to the first location of the treatment zone, inserting the introducer through the skin surface and to the first location of the treatment zone. The method may further include inserting the at least one needle of the cryogenic device via the introducer through the skin surface and to a second location of the treatment zone and activating the cryogenic device such that the at least one needle creates a second ice ball proximate to the target tissue, thereby eliminating or reducing the severity of pain. The at least one needle may be removed from the introducer at the second location of the treatment zone the second ice ball remains coupled to a distal portion of the introducer at the second location of the treatment zone.

According to various embodiments, identifying the location of the treatment zone may include stimulating the nerve with an electrically conductive surface of the at least one needle. Inserting the at least one needle of the cryogenic device via the introducer through the skin may include inserting the at least one needle until the proximal end of the at least one needle is flush with a proximal end of the introducer.

According to at least some embodiments, the target tissue may include a medial branch nerve. The target tissue may include a basivertebral nerve. The target tissue may include a sacroiliac joint.

According to various embodiments, the cryogenic device further includes a needle guard for housing the at least one needle. The needle guard may include a slotted feature for receiving a connection for a cord of the nerve stimulator such that the cord remains coupled to the probe body during an entire treatment. Advantageously, a health care professional may leave the nerve stimulator coupled to the cryogenic device during the entire treatment without having to disconnect and reconnect. Furthermore, depressing a coupling mechanism on the needle guard may enable removal of both the probe body and the needle guard from the handpiece simultaneously for safe and sanitary disposal.

DETAILED DESCRIPTION

Figure 1:
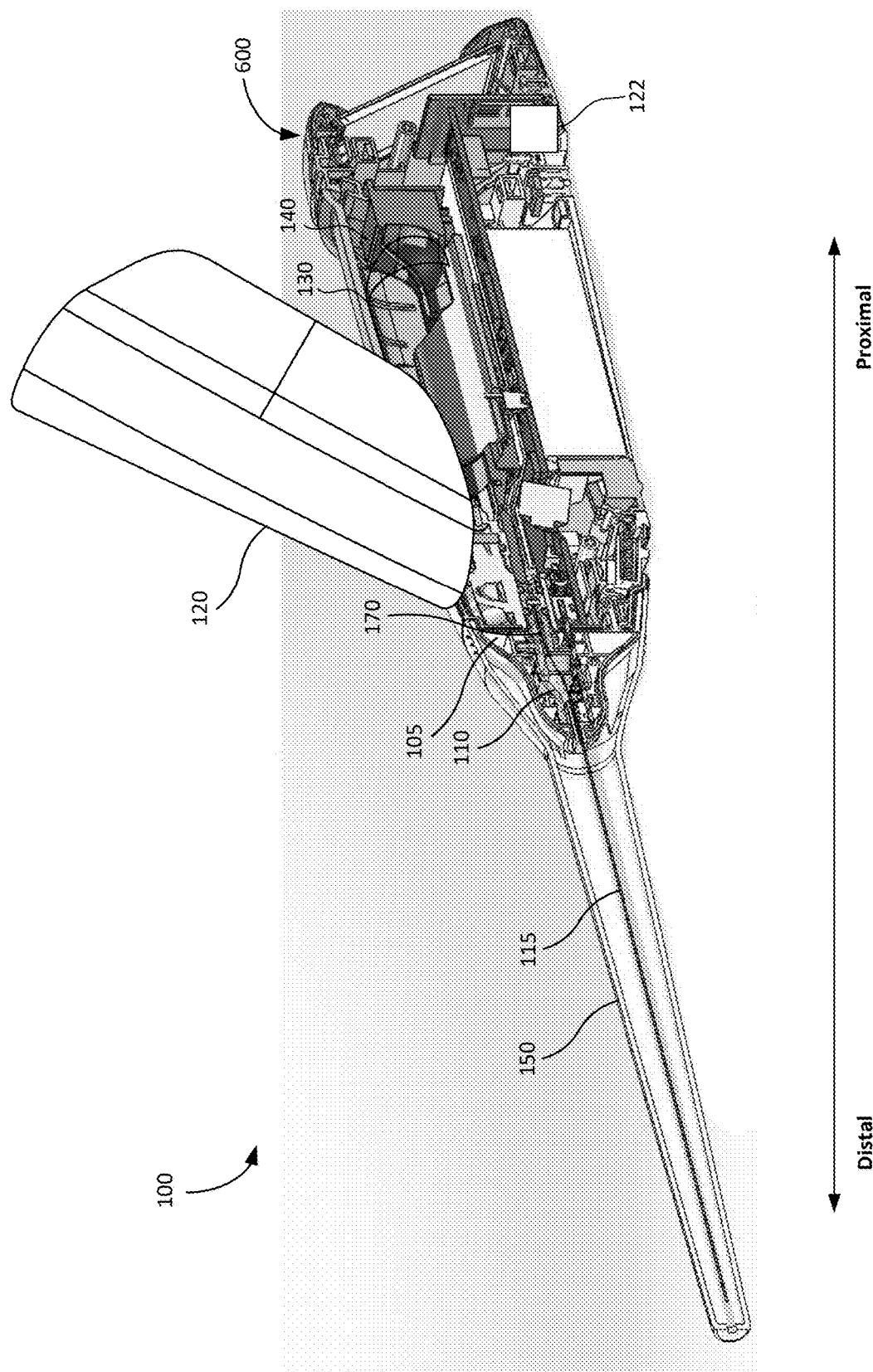
FIG. 1 illustrates an example embodiment of a cryogenic device including a probe receptacle and a needle probe, according to embodiments of the present disclosure.

The present invention provides improved medical devices, systems, and methods. Embodiments of the invention may treat target tissues disposed at and below the skin, optionally to treat pain associated with lower back pain and/or various spinal conditions. In some embodiments, systems, devices, and methods of the present disclosure may utilize an integrated cold therapy and nerve stimulation device for localization and treatment of a target nerve.

Nerve or tissue locating technologies may be used in various embodiments described herein. In the case of peripheral nerves, electrical stimulation or ultrasound can be used to locate target nerves for treatment. Electrical nerve stimulation can identify the nerve upon stimulation and either innervated muscle twitch in the case of a motor nerve or altered sensation in a specific area in the case of a sensory nerve. Ultrasound imaging or fluoroscopy may be used to visualize the nerve and structures associated with the nerve (e.g., vessels) to assist in placing the cryoprobe in close proximity to the target nerve. By positioning the patient's skeletal structure in a predetermined position (e.g., knee bent 30 degrees or fully extended), one can reliably position the bones, ligaments, cartilage, muscle, soft tissues (including fascia), vasculature, and peripheral nerves. External palpation can then be used to locate the skeletal structure and thereby locate the pathway and relative depth of a peripheral nerve targeted for treatment. Embodiments of electrical nerve stimulation for locating target nerves are disclosed in commonly assigned International Publication No. WO WO2019099677A1, the entirety of which is incorporated by reference herein.

Sensory nerves and associated tissues may be temporarily impaired using moderately cold temperatures of 10° C. to −5° C. without permanently disabling the tissue structures. Using an approach similar to that employed for identifying structures associated with atrial fibrillation or for peripheral nerve blocks, a needle probe or other treatment device can be used to identify a target tissue structure in a diagnostic mode with these moderate temperatures, and the same probe (or a different probe) can also be used to provide a longer term or permanent treatment, optionally by treating the target tissue zone and/or inducing apoptosis at temperatures from about −5° C. to about −50° C. In some embodiments, apoptosis may be induced using treatment temperatures from about −1° C. to about −15° C., or from about −1° C. to about −19° C., optionally so as to provide a longer lasting treatment that limits or avoids inflammation and mobilization of skeletal muscle satellite repair cells. In some embodiments, axonotmesis with Wallerian degeneration of a sensory nerve is desired, which may be induced using treatment temperatures from about −20° C. to about −100° C. Hence, the duration of the treatment efficacy of such subdermal cryogenic treatments may be selected and controlled, with colder temperatures, longer treatment times, and/or larger volumes or selected patterns of target tissue determining the longevity of the treatment. Additional description of cryogenic cooling methods and devices may be found in commonly assigned U.S. Pat. No. 7,713,266 entitled "Subdermal Cryogenic Remodeling of Muscle, Nerves, Connective Tissue, and/or Adipose Tissue (Fat)", U.S. Pat. No. 7,850,683 entitled "Subdermal Cryogenic Remodeling of Muscles, Nerves, Connective Tissue, and/or Adipose Tissue (Fat)", U.S. Pat. No. 9,039,688 entitled "Method for Reducing Hyperdynamic Facial Wrinkles", and U.S. Pat. No. 8,298,216 entitled "Pain Management Using Cryogenic Remodeling," the full disclosures of which are each incorporated by reference herein.

The present disclosure describes cryogenic devices that may be used to deliver cryotherapy to patients. In some embodiments, the described cryogenic devices may include needles for delivering cryotherapy subcutaneously to target particular tissues for treating a variety of conditions. For example, the cryogenic devices may include needles that are configured to be inserted near peripheral nerves to deliver cryotherapy to the peripheral nerves to treat pain, spasticity, or other such conditions that may be improved by such therapy. More information about the use of cryotherapy for alleviation of pain or spasticity, may be found in U.S. Pat. No. 8,298,216 filed Nov. 14, 2008; U.S. Pat. No. 9,610,112 filed Mar. 18, 2014; U.S. Pat. No. 10,085,789 filed Mar. 13, 2017; U.S. Patent Publn No. 20190038459 filed Sep. 14, 2018, the full disclosures of which are incorporated herein by reference in their entirety for all purposes. The cryogenic devices may also be used for prophylactic treatment such as disruption or prevention of neuromas, for example, as described in U.S. Pat. No. 10,470,813 filed Mar. 14, 2016, the full disclosure of which is incorporated herein by reference in its entirety for all purposes.

FIG. 1 illustrates an example embodiment of a cryogenic device 100 including a cartridge holder 140 for holding a cryogen cartridge 130 and a needle probe 110. As shown in the illustrated example embodiment, the cryogenic device 100 may be a self-contained handpiece suitable for being grasped and manipulated by an operator's hand. In other embodiments, the cryogenic device may include physically separated components. For example, the cryogenic device 100 may include a handpiece including a needle probe 110 and a cryogen cartridge 130 that is separated from the handpiece. As will be discussed herein, in some embodiments, the cryogenic device 100 may have a multi-part (e.g., a two-part) housing, with the needle probe 110 disposed within a separate probe housing that may be coupled to a housing of a handpiece portion. In other embodiments, the needle probe 110 may not be disposed within a separate housing and may be configured to be inserted directly into the housing of the cryogenic device 100. As an example, the cryogenic device 100 in at least some of these embodiments may have a single housing.

In some embodiments, the cryogen cartridge 130 may be a disposable cartridge filled with a cryogen (e.g., nitrous oxide, fluorocarbon refrigerants, and/or carbon dioxide). In some embodiments, the cryogenic device 100 may include a cartridge door 120 for accessing the cryogen cartridge 130 (e.g., to replace it). The cartridge door 120 may be configured to move from an open position for allowing the cartridge holder 140 to receive a cryogen cartridge 130 to a closed position for securing the cryogen cartridge 130 within the housing of the cryogenic device 100. For example, the cartridge door 120 may be configured to swivel around a swivel point to allow access to the cryogen cartridge 130. In this example, a user may open the cartridge door 120 (e.g., when the user notices or is otherwise alerted that the cryogen cartridge 130 is empty) as shown in FIG. 1, remove the cryogen cartridge 130 from the cartridge holder 140, insert a new cryogen cartridge 130 into the cartridge holder 140, and close the cartridge door 120. The described example configuration of the cartridge door 120 and the cartridge holder 140 was designed with user convenience in mind. The cartridge door 120 may be quickly swiveled open with minimal effort and a replacement cryogen cartridge 130 may be inserted with ease. This may be particularly advantageous in cases where an operator has to replace a cryogen cartridge 130 during a procedure. For example, in some cases, an operator may need to replace a cryogen cartridge 130 during a treatment cycle after a needle 115 of the needle probe 110 have already been inserted into the patient's skin (e.g., in cases where cryogen is depleted during a treatment cycle). In this example, due to the described cartridge door design, the operator may be able to leave the needle 115 in the patient's skin while replacing the cryogen cartridge 130. As a result, the operator is not forced to take the time and effort to reposition the needle 115 at the desired location. In some embodiments, the cryogenic device 100 may include a valve between the cryogen cartridge 130 and the cryogen pathway for sealing off the cryogen in the cryogen cartridge 130 from the cryogen pathway (e.g., when a treatment cycle is not occurring).

In some embodiments, as illustrated in FIG. 1, the cryogenic device 100 may include a probe receptacle 170 configured to receive a needle probe 110. In some embodiments, the probe receptacle 170 may be bored into a chassis 105 of the cryogenic device, wherein the chassis 105 includes at least a portion of the cryogen pathway. For example, the chassis 105 may include one or more lumens therein that are coupled to an outlet of the cryogen cartridge 130, and the one or more lumens of the chassis 105 may be coupled to the probe receptacle. In some embodiments, the chassis 105 may include the entire cryogen pathway within the handpiece portion of the cryogenic device 100 (e.g., from the outlet of the cryogen cartridge 130 to the probe receptacle 170). In some embodiments, the chassis 105, or at least the interior surface of the cryogen pathway formed by the chassis 105, may be made of a metal material. The metal material may be configured to reduce the number of nucleation sites and reduce or prevent formation of bubbles from vaporization of the cryogen. As an example, the metal material may be aluminum (or an aluminum alloy). Data has shown that a metal material that includes aluminum may be particularly suitable for reducing or preventing formation of bubbles from vaporization of cryogen (e.g., as the cryogen is flowed along the cryogen pathway), due to the intrinsic properties of aluminum and aluminum alloys. In other embodiments, instead of a metal material, a particular polymer material or a plastic material may be selected based on a determination that the material has a low number of nucleation sites. By reducing the formation of bubbles, it becomes less necessary to prime the cryogenic device 100, thereby reducing the waste of cryogen (and time spent) in priming the device. Experimental data also shows that reducing the length of the cryogen pathway similarly had the effect of reducing the formation of bubbles. As such, the cryogen pathway of the cryogenic device 100 may be of a reduced length, for example, with an optimized device design positioning the cryogen cartridge 130 close to the needle probe 110 and optimized cryogen pathway taking the shortest possible route between the cryogen cartridge 130 and the needle probe 110. In some embodiments, the needle probe 110 may be detachable and/or disposable. In some embodiments, an operator may be able to attach or detach needle probes of different probe types. For example, an operator may attach a first needle probe having a three-needle configuration to perform a first treatment, detach the first needle probe and replace it with a second needle probe having a different needle configuration.

In some embodiments, the needle probe 110 may be releasably coupled with the probe receptacle 170 so that the needle 115 may be replaced after use with a sharper needle or with a needle having a different configuration. In exemplary embodiments, the needle 115 may be threaded into the needle probe 110, press fit into an aperture in the needle probe 110 or have a quick disconnect such as a detent mechanism for engaging the needle probe 110 with the probe receptacle. For example, the needle 115 may be bonded to the needle probe 110 with a heat-cured epoxy adhesive. A quick disconnect feature may be a useful safety feature in the event that the cryogenic device 100 fails in operation (e.g., valve failure). The quick disconnect may enable an operator to disengage the needle 115 and cryogenic device 100 from a patient's tissue without exposing the patient to coolant as the system depressurizes.

Processor or controller 122 will typically comprise a programmable electronic microprocessor embodying machine-readable computer code or programming instructions for implementing one or more of the treatment methods described herein. The microprocessor will typically include or be coupled to a memory (such as a non-volatile memory, a flash memory, a read-only memory ("ROM"), a random access memory ("RAM"), or the like) storing the computer code and data to be used thereby, and/or a recording media (including a solid state recording media such as a flash memory drive; a magnetic recording media such as a hard disk, a floppy disk, or the like; or an optical recording media such as a CD or DVD) may be provided. Suitable interface devices (such as digital-to-analog or analog-todigital converters, or the like) and input/output devices (such as USB or serial I/O ports, wireless communication devices, graphical display cards, and the like) may also be provided. A wide variety of commercially available or specialized processor structures may be used in different embodiments, and suitable processors may make use of a wide variety of combinations of hardware and/or hardware/software combinations. For example, processor 122 may be integrated on a single processor board and may run a single program or may make use of a plurality of boards running a number of different program modules in a wide variety of alternative distributed data processing or code architectures.

In the exemplary embodiments illustrated herein, the needle probes are illustrated as having one needle. One skilled in the art will appreciate that the needle probes may have any suitable number of needles (e.g., a single needle, two needles, three needles, four needles, five needles, or more needles). When a plurality of needles is used, they may be arranged in any number of patterns. For example, a single linear array may be used, or a two-dimensional or three-dimensional array may be used. Examples of two-dimensional arrays include any number of rows and columns of needles (e.g., a rectangular array, a square array, elliptical, circular, triangular, etc.), and examples of three-dimensional arrays include those where the needle tips are at different distances from the probe hub, such as in an inverted pyramid shape.

Figure 4:
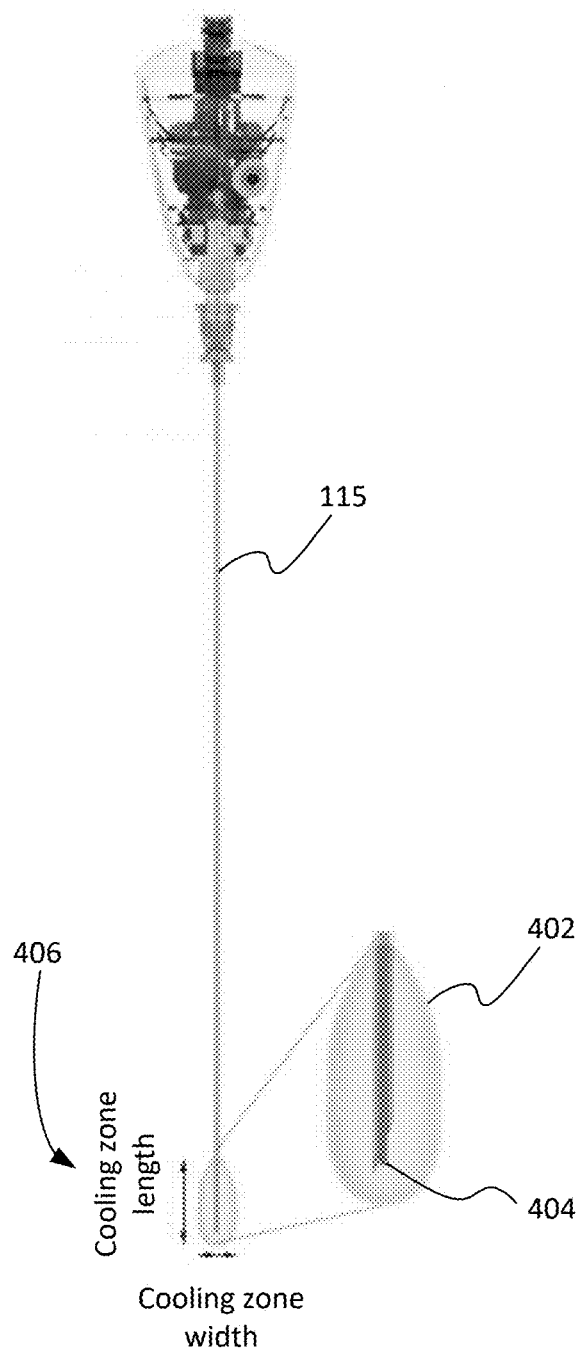
FIG. 4 illustrates an exemplary ice ball formed by the needle probe of FIG. 1, according to embodiments of the present disclosure.

According to at least some embodiments of the present disclosure, the needle 115 is a blunt needle. The needle 115 may be a 25 G or greater blunt needle, according to at least some embodiments. Furthermore, the needle may be greater than or equal to 175 mm in length. In the exemplary embodiment, the needle gauge may be larger, and the length may be shorter provided that the ID/OD ratio is within the 0.756 to 0.85, inclusive, range as described herein. Manufacturing the needles described herein (e.g., double the length of the needle while reducing the gauge size) was a particularly challenging endeavor. Advantageously, the needle 115 includes a silica tubing, to be described in further detail below, and varying the diameter of the silica tubing and the ratio between the needle outer diameter and the needle inner diameter, formed a needle for obtaining teardrop shaped ice balls (as illustrated in FIG. 4) while avoiding undesirable ice ball shapes and needle frosting. The needle 115 enables a healthcare professional to position the ice ball center more distal to the end of needle. For example, the tip geometry featuring a blunt design and the disclosed silica length, ensures a safer and more effective cryoneurolysis treatment for the targeted nerve. Furthermore, the needle 115 may be formed using a specialized welding technique that minimizes material usage and excess mass at the very distal tip of the needle 115. The inventors were able to balance the flow rate (and exhaust or venting) for the desired treatment dosing (temperature/time).

Advantageously, the length of the needle 115 is sufficient to treat target peripheral nerves such as nerves associated with lower back pain including lumbar facet joints having medial branch nerves (e.g., peripheral spinal nerves). For example, the length of the needle 115 is suitable for reaching deep medial branch nerves. By doubling the length of the needle 115 (as compared to other treatment systems) and reducing the gauge of the needle to 25 G or greater, teardrop shaped or elongated ice balls (e.g., having a larger volume toward the distal tip of the needle 115) are formed, as shown in FIG. 4. Such ice balls are uniquely suited for treating various conditions described herein. For example, various embodiments of the present disclosure may be applied for treatment of the sacroiliac joints (SI joints) where a longer ice ball (compared to a rounder, more symmetrical ice ball) is preferred for treating nerves within the SI joint. In various embodiments, the ice ball may be circular, oval shaped, a slot-like shape, etc.

Embodiments of the present disclosure may be applied to various nerve targets including, but not limited to, supraorbital and trigeminal nerves, suprascapular nerve, genitofemoral nerves, ilioinguinal, iliohypogastric, lateral femoral cutaneous, and pudendal nerves, sural, saphenous, and superficial peroneal nerves, infrapatellar saphenous, anterior femoral cutaneous, and deep genicular nerves, lumbar medial branch nerves, etc. Furthermore, embodiments of the present disclosure, particularly those describing formation of shorter and rounder ice balls, may be applied to anatomical locations such as the cervical medial branch, the thoracic medial branch, the intercostal nerves, etc. Embodiments of the present disclosure, particularly those describing formation of elongated ice balls, may be applied to anatomical locations such as the greater and lesser occipital nerves, the sacroiliac joint nerves, the cluneal nerves, the trochanteric bursa, rectal nerves, etc. Various conditions may be treated according to embodiments of the present disclosure including, but not limited to, phantom limb pain, surgical pain management such as from procedures including total knee arthroplasty, thoracotomy, mastectomy, etc., Morton's neuroma, chronic migraines and/or other neurology-related applications, rib fracture, diabetic neuropathy pain, PENG blocks (pericapsular nerve group, hip), spasticity, application associated with advanced acupuncture techniques (e.g., cryo-auriculotherapy), sports injuries (e.g., ankle sprains), etc. Additional nerves/indications that may be treated according to embodiments of the present disclosure include the pudendal nerve for treating pudendal neuralgia which causes pelvic pain, the celiac plexus for treating pain in the upper abdomen including pancreatitis, liver cancer, stomach cancer, etc., the hypogastric plexus for treating nerves in the lower abdomen and pelvis for further treating chronic pelvic pain (e.g., pain from colon, bladder, lower intestines, uterus, ovaries, prostate, etc.), the stellate ganglion for treating pain in the head, neck, chest, or arm caused by conditions like reflex sympathetic dystrophy, nerve injury, shingles, etc. Embodiments of the present disclosure may be used to further treat cardiac arrythmias. Further embodiments of the present disclosure may be used to treat post-traumatic stress disorder (PTSD).

In at least some embodiments, the needle 115 includes an electrically conductive surface for performing neurostimulation and determining the position in the tissue of the patient proximal to target tissue. The needle 115, e.g., the needle probe 110, may be couplable to a percutaneous peripheral nerve stimulation (PENS) device (not shown) for performing the neurostimulation. According to at least some embodiments, the needle 115 does not include a dielectric (e.g., insulating) coating of any type. In other embodiments, a dielectric coating may be applied to at least a portion of the needle 115. In yet further embodiments, a dielectric coating may be applied to the entire circumference of the needle 115 except for a portion of the needle 115 for forming an exposed portion of the needle 115.

Figure 3:
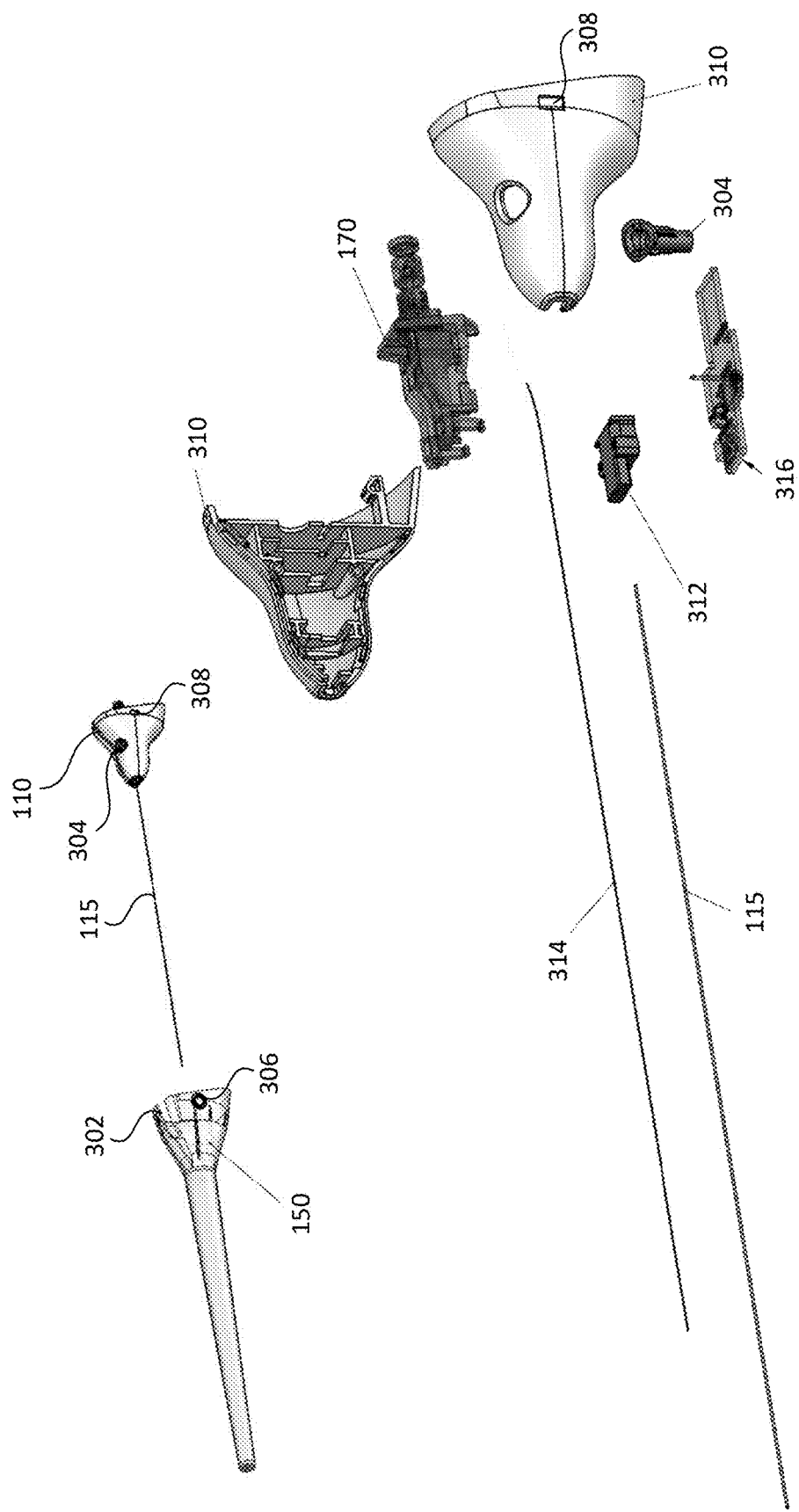
FIG. 3 is an exploded view of the needle probe of FIG. 1, according to embodiments of the present disclosure.

According to some embodiments, the needle 115 includes silica tubing (such as silica tubing 314 as shown in FIG. 3). In particular, the needle may include silica having a 65 μm inner diameter (ID)×135 μm outer diameter (OD). The ratio of the inner and outer diameters (ID/OD) of the needle may be in a range between 0.756 to 0.85, inclusive. In various embodiments, the needle includes a thin wall to facilitate passage through curvatures while remaining sealable through welding at its distal end. Minimal stainless-steel material may be used for welding the distal end to ensure flexibility while maintaining a leak-proof seal. The silica may be prepared through precise cleaving to form a lumen providing a flow path to provide cryogen to the distal end of the needle 115. The ID selection of the silica size results in proper ice ball formation and the OD is minimized to improve exhaustion space available within the needle 115. For example, occlusion within the needle 115 is reduced. In particular, the valve opening time may be expanded and the ice ball is formed along the distal portion of an introducer. In at least some embodiments, the needle 115 may be formed of minimal material to optimize the use of material and welding methodology for blunt tip needles to enhance the flexibility of the needle 115 for mating with a straight or curved tip introducer, to be described in further detail below. In exemplary embodiments, the needle 115 is flexible enough to be introduced into target tissue via a straight or curved introducer, to be described in further detail below. The needle 115 may be removed from the introducer and used at a different treatment site with a new introducer, thereby reducing the overall treatment time. In particular, a system with only a cooling needle (e.g., without an introducer) would form an ice ball and a health care professional would have to wait for the ice ball to melt before continuing to the next treatment site. Beneficially, the needle as described herein may be removed from the introducer having the ice ball coupled thereto and the needle may be used to form a second ice ball as the first ice ball is melting. Advantageously, a long needle having silica tubing with the appropriate ratio between the inner diameter and outer diameter forms ice balls for the intended applications.

In various embodiments, the cryogenic device 100 further includes a needle guard 150. The needle guard 150 is a safety mechanism that covers the needle 115 when the cryogenic device 100 is not in use. Furthermore, the needle 115 may be couplable to a nerve stimulator via a cable of the nerve stimulator (not shown). The needle guard 150 may provide further protection for the needle 115 and house the needle probe 110 and the needle 115 when a cable of a nerve stimulator is coupled to the needle probe 110, to be described in further detail below. The needle guard 150 may be transparent or opaque in various embodiments.

Figure 2A:
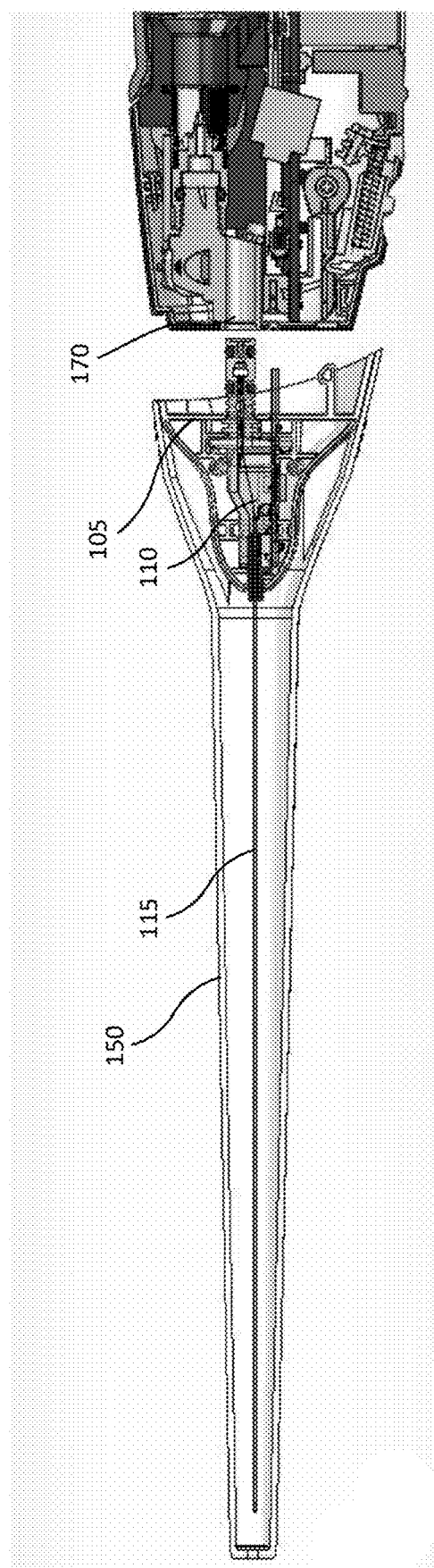
FIG. 2A illustrates the needle probe decoupled from the probe receptacle of FIG. 1, according to embodiments of the present disclosure.
Figure 2B:
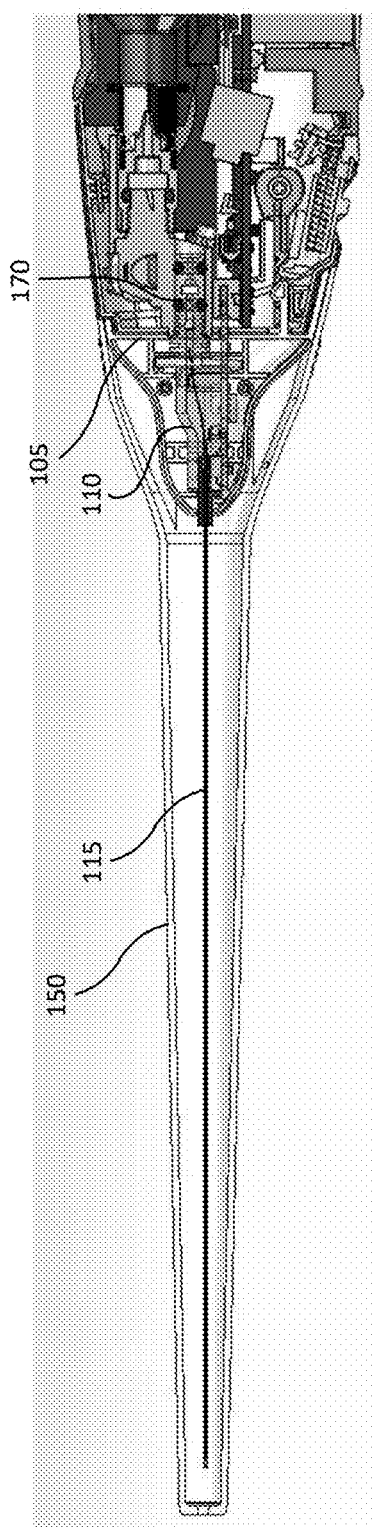
FIG. 2B illustrates the needle probe coupled to the probe receptacle of FIG. 1, according to embodiments of the present disclosure.

FIG. 2A illustrates the needle probe 110 decoupled from the probe receptacle 170 of FIG. 1 and FIG. 2B illustrates the needle probe 110 coupled to the probe receptacle 170 of FIG. 1. The needle guard 150 may be removably coupled to the needle probe 110 such that the needle guard 150 and the needle probe 110 are removed from the probe receptacle 170 together as one unit. The needle guard 150 may further be removed from the needle probe 110 and the needle probe 110 may be removed from the probe receptacle 170 separately, in various embodiments. Advantageously, the needle probe 110 is configured for removal from the probe receptacle 170 with or without being coupled with the needle guard 150 provided herein, depending on the health care professional's preference, the stage of the procedure, etc.

FIG. 3 is an exploded view of the needle probe 110. The needle probe 110 supports and is coupled to needle 115 that includes silica tubing 314. The needle 115 may be covered and removably coupled to a needle guard 150. As shown in FIG. 3, the needle guard 150 may include a slotted feature 302 for receiving a connection 304 on the needle probe 110 for a cable of the nerve stimulator (not shown) to be inserted into or otherwise coupled to. According to various embodiments, the slotted feature 302 is sized and shaped such that a cable may be coupled with the connection 304 while the needle guard 150 is coupled with the needle probe 110. Accordingly, there is no interference between the needle guard 150 and the cable while the cable is coupled with the connection 304. Advantageously, the needle guard 150 safely house the needle probe 110 and the needle 115 and maintains electrical connection with the nerve stimulator during extended treatment times (e.g., 10 minutes, 15 minutes, 20 minutes, etc.). Accordingly, the health care professional is able to safely move about during the procedure without having to disconnect or reconnect the electrical connection. Furthermore, the health care professional is able to engage and disengage the needle guard 150 while maintaining the electrical connection with the PENS.

According to various embodiments, the needle guard 150 further protects the shape (e.g., either straight or curved) of the needle 115 during use (e.g., between treatment cycles) and storage. For example, the needle guard 150 reduces incidences of unwanted bending of the needle 115 during transportation, storage, or the like, thereby ensuring the needle 115 remains in a usable condition up until, and during, the procedure. The needle guard 150 further provides a sanitary cover for the needle 115 when the needle 115 is not inserted into the skin of the patient or the like. For example, the needle guard 150 protects the needle 115 from touching a contaminated surface or otherwise unhygienic surface between treatment cycles and/or before a procedure begins.

According to various embodiments, the needle guard 150 may further include a coupling mechanism 306 disposed on an interior and exterior surface of the needle guard 150 to maintain the needle probe 110 within the needle guard 150 when the needle guard 150 is coupled to the needle probe 110. As shown in FIG. 3, the coupling mechanism 306 may include a bullseye as an indicator for a user to apply pressure to. Corresponding detents (not shown) within the needle guard 150 may be forced into the corresponding indents 308 on the needle probe 110 such that the needle guard 150 grasps the needle probe 110 and the needle guard 150 and the needle probe 110 may be removed together (e.g., coupled to each other). In various embodiments, if no pressure is applied to the coupling mechanism 306, the needle guard 150 may be removed from the needle probe 110 without removing the needle probe 110 from the probe receptacle 170.

According to some embodiments, the needle probe 110 may include a housing 310. The housing 310 may be a two-part housing or an integrally formed housing, according to various embodiments. Within the housing 310, a heater block 312 is disposed. The heater block 312 may be used to warm the skin during treatment for reducing the incidence of cold-related thermal injury, especially when used with relatively shorter needles. The heater block 312 may additionally be used to hold and warm the needle 115 and/or the cooling fluid, in some embodiments. In particular, the heater block 312 may be used to hold the needle 115 straight relative to an axis of the cryogen device 100. The heater block 312 may be designed to have sufficient clearance for an adhesive to hold the heater block 312 in place within the housing 310.

In some embodiments, it may be preferable to limit frozen tissue that is not at the treatment temperature, i.e., to limit the size of a formed ice ball (e.g., the cryozone) within tissue. Such ice balls may be associated with a particular physical reaction, such as the formation of an ice ball, or with a particular temperature profile or temperature volume gradient required to therapeutically affect the tissue therein.

To achieve this, metering coolant flow could maintain a large thermal gradient at its outside edges. This may be particularly advantageous in applications for creating an array of connected ice balls (i.e., fence) in a treatment zone, as time would be provided for the treatment zone to fully develop within the fenced in portion of the tissue, while the outer boundaries maintained a relatively large thermal gradient due to the repeated application and removal of cooling power. This could provide a mechanism within the body of tissue to thermally regulate the treatment zone and could provide increased ability to modulate the treatment zone at a prescribed distance from the surface of the skin. A related treatment algorithm could be predefined, or it could be in response to feedback from the tissue. Various embodiments of the present disclosure may be implemented by a printed circuit board assembly (PCBA) 316 and components thereof and/or connected thereto such as processor 122 as described with respect to FIG. 1.

FIG. 4 illustrates an exemplary ice ball formed by the needle probe of FIG. 1. In particular, FIG. 4 illustrates an ice ball 402 having a teardrop shape formed on the distal tip 404 of the needle 115 and on a distal portion 406 of an introducer 408, to be described in further detail below. The teardrop includes a larger volume toward the distal tip 404 of the needle 115 compared to a proximal end of the ice ball 402. Such ice balls are uniquely suited for treating various conditions as described herein. According to exemplary embodiments, the ice ball 402 may have a length A 15.5±5 mm in length (along the introducer 408) and a width B 7.5±5 mm at its widest width (along an axis perpendicular to the introducer 408).

Figure 5:
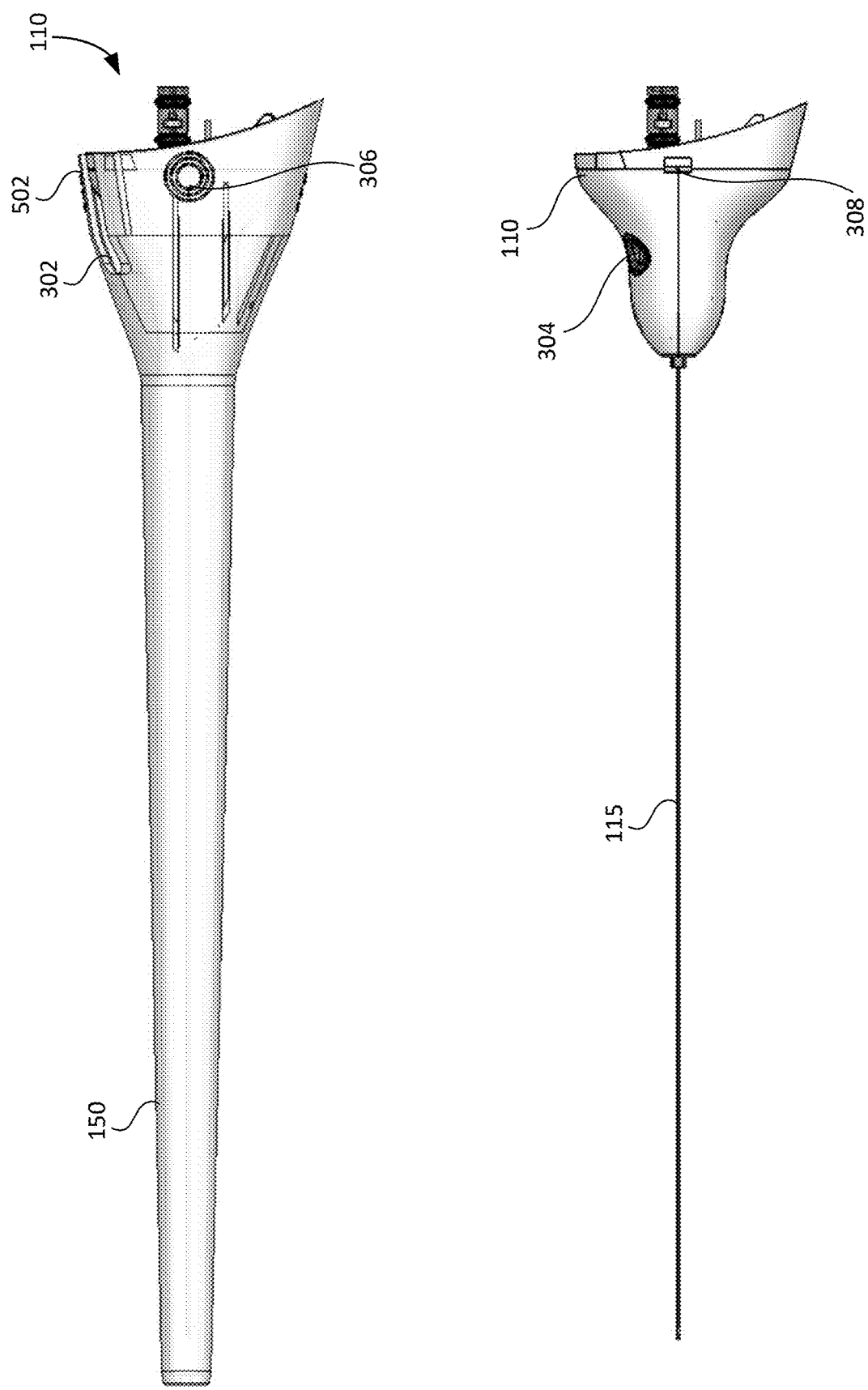
FIG. 5 illustrates the needle guard and the needle probe of FIG. 1, according to embodiments of the present disclosure.

FIG. 5 illustrates the needle guard 150 and the needle probe 110 of FIG. 1. As more clearly shown in FIG. 5, the needle guard 150 includes a coupling mechanism 306 disposed on an interior and exterior surface of the needle guard 150 to maintain the needle probe 110 within the needle guard 150 when the needle guard 150 is coupled to the needle probe 110. As shown in FIG. 3, the coupling mechanism 306 may advantageously include a bullseye as an indicator for a user to apply pressure to. In other embodiments, the coupling mechanism 306 may be indicated by a different shape and/or color. As further shown in FIG. 5, the needle guard 150 may include gripping mechanism 502 (e.g., chevrons or the like) for aligning the needle guard 150 on the needle probe 110 and indicating the direction of removal of the needle guard 150 and/or the needle probe 110 from a probe receptable. The gripping mechanism 502 enables removal of the needle guard 150 from the needle probe 110 when the needle probe 110 remains coupled to the probe receptacle and the cryogenic device.

Figure 6:
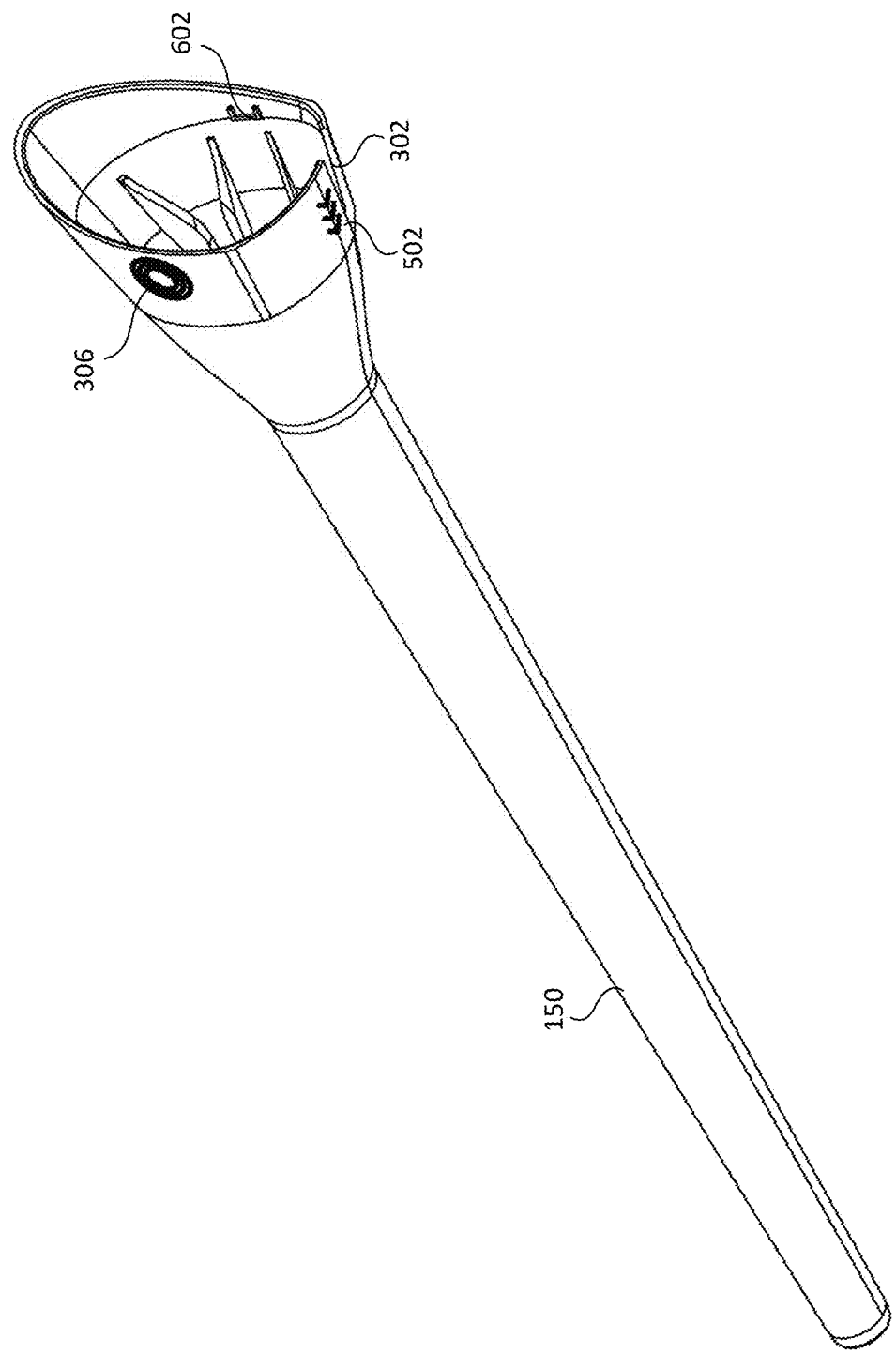
FIG. 6 illustrates a perspective view of the needle guard of FIG. 1, according to embodiments of the present disclosure.

FIG. 6 illustrates a perspective view of the needle guard 150 of FIG. 1. From this view the detents 602 of the coupling mechanism 306 of the needle guard 150 are visible. As would be appreciated by those skilled in the art, the coupling mechanism 306 aligns with the detent 602. Pressure applied to the coupling mechanism 306 forces the detents 602 inward, and, when a needle probe 110 is present, the detents 602 insert into corresponding indents 308 for grasping the needle probe 110 within the needle guard 150. Accordingly, the needle guard 150 may become removably coupled to the needle probe 110 and both the needle guard 150 and the needle probe 110 may be removed from a probe receptable. According to various embodiments, a pair of coupling mechanisms 306 may be disposed on opposing sides of the exterior of the needle guard 150 and corresponding detents 602 may be disposed on opposing sides of the interior of the needle guard 150, however, one set or more than two sets of coupling mechanisms 306 and detents 602 may be provided.

Figures 7A, 7B:
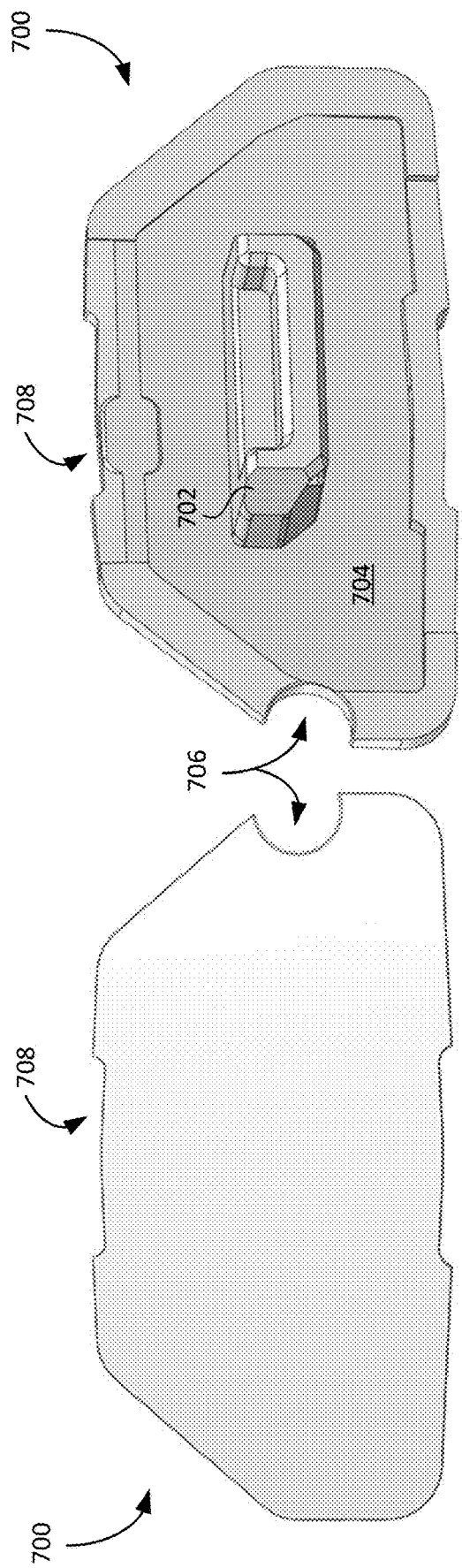
FIG. 7A illustrates an outward facing view of an access cover of a cryogenic device, according to embodiments of the present disclosure.
FIG. 7B illustrates an inward facing view of the access cover of the cryogenic device, according to embodiments of the present disclosure.

FIG. 7A illustrates an outward facing view of an access cover 600 of a cryogenic device 100 and FIG. 7B illustrates an inward facing view of the access cover 700 of the cryogenic device 100. The access cover 700 may be a semi-permanent USB port cover that utilizes the internal features of a port to secure itself. Access to internal ports of the cryogenic device represents a potential electrical safety risk. The addition of the access cover 700 reduces unintentional access to the port(s) and may require a tool to remove the access cover 700. The access cover 700 further provides electrical isolation from the interior of the cryogenic device 100. The access cover 700 may include materials such as Makroblend EL700, PC, PET, and other similar plastic blends. These materials securely prevent access to the port while providing high dielectric strength, flame, chemical, and impact resistance to the design of the cryogenic device.

According to various embodiments, the access cover 700 may be removed with a specialized tool for increased cybersecurity and electrical safety. In various embodiments, the access cover 700 includes a retention feature 702 on the interior side 704 as shown in FIG. 7B. The retention feature 702 may be secured to the cryogenic device via press fit interference. Furthermore, the access cover 700 may include a reset button through hole 706 (or a partial through hole 706 as shown in FIGS. 7A and 7B) and another cutout slot 708 on the top side of the access cover 700. The reset button through hole 706 enables access to a manual reset button on the cryogenic device without compromising the design intent of securing access to USB port without a tool. In various embodiments, the access cover 700 surface profile is sized and shaped such that the access cover 700 sits sub-flush on the cryogenic device 100. The access cover 700 substantially prevents unintentional access to the USB port without the use of a tool for removal.

Various materials can be used to produce the access cover 700 based at least in part on the applicability to many risk mitigation efforts related to electrical safety, but also cybersecurity risks given port access prevention for stopping physical connection and/or hacking attempts. Dielectric coatings for electrical insulation or mechanical based coatings such as bead blasting, or polish can be added or otherwise transferred to the access cover 700 for providing specific electrical and/or mechanical properties. The access cover 700 may include various elements such as oversizing, addition of screw attachments, latching features to hold access cover 700 in place, mechanical pin expanding securement features, hiding the access cover 700 such that prior knowledge is needed to access the port, etc. The access cover 700 may be applied to any type of I/O port known in the art including USB ports, micro-USB, mini-USB, USB-C, Apple Lightning Port, Thunderbolt, etc.

Various embodiments of the present disclosure provide a needle and workflow for providing a cryogenic treatment alternative to RF ablation for lower back pain (LBP) derived from lumbar facet joints, include medial branch nerves (e.g., peripheral spinal nerves). Further applications include treatments to basivertebral nerves (BVN), SI joints, sciatic nerves, radiculopathy, nerve compression syndrome, herniated discs, neuropathy, spinal stenosis, degenerative disc disease, spondylolisthesis, spinal osteoarthritis, spasticity, any other spinal applications, etc., including any other application and/or treatment zone described herein. As discussed above, a needle as described herein may be a blunt needle having a length greater than or equal 175 mm. The needle may be uniquely applicable for accessing deep nerves and forming an ice ball (e.g., cooling zone) at the appropriate depth for treating the foregoing conditions. Furthermore, embodiments of the present disclosure provide improvements in cryogen delivery efficiency, reduced treatment cycle time, and compatibility with commercially available introducers.

Figure 8:
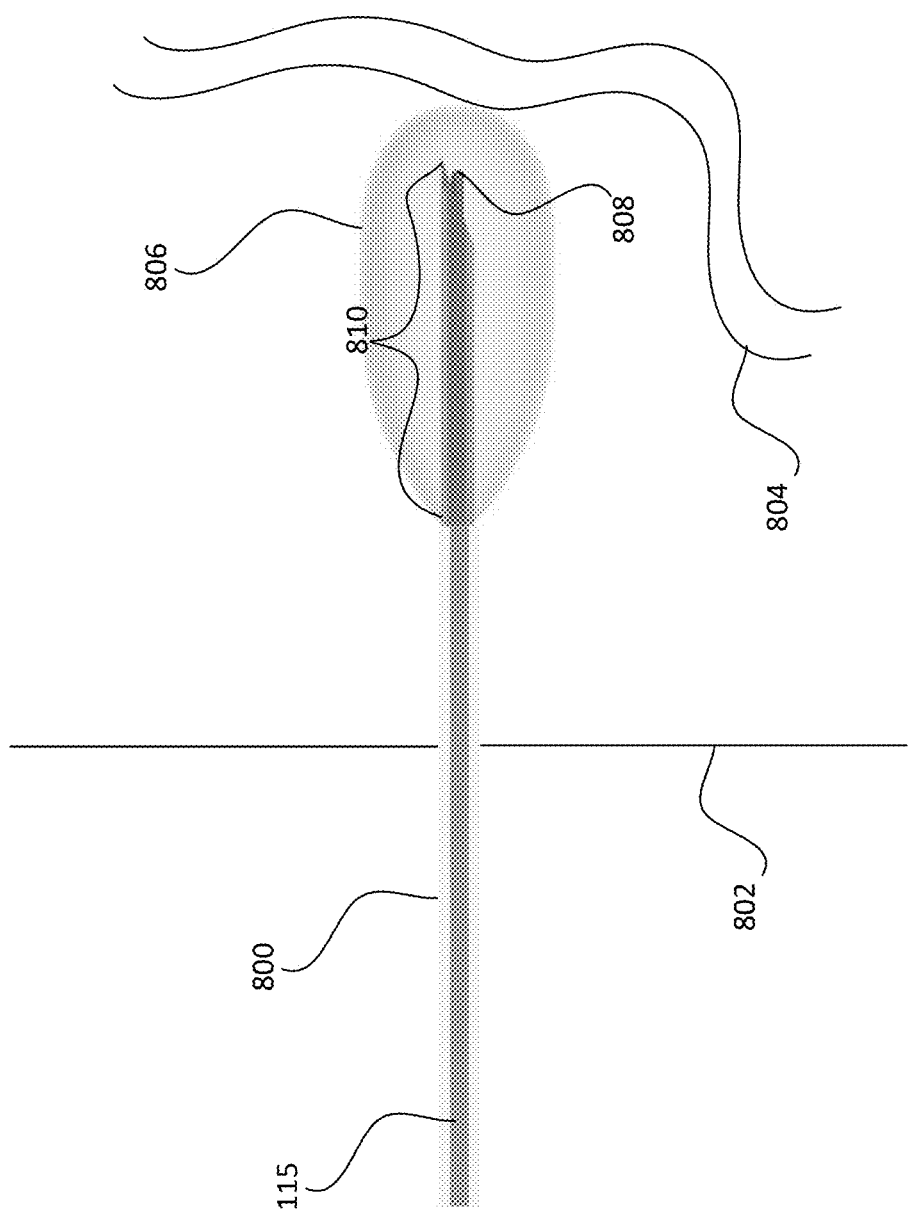
FIG. 8 illustrates a needle and introducer system for providing cryogenic treatment to a target tissue, according to embodiments of the present disclosure.

FIG. 8 illustrates an exemplary needle system for delivering cryogen therapy to a target tissue. The needle includes a single long, blunt needle with electrical nerve stimulation capability to aid in precise nerve location, such as needle 115 described herein. In various embodiments, the needle is at least a 25 G needle. According to various embodiments of the present disclosure, an introducer 800 is provided for inserting the needle 115 into the target tissue of a patient. The introducer 800 may have a gauge between 15 G and 20 G, inclusive, according to various embodiments. The introducer 800 may be a radiofrequency (RF) introducer that provides a path for the needle 115 through the skin 802 of the patient to the target tissue 804 of the patient for forming an ice ball 806 at the distal tip 808 of the needle 115 and along at least a portion of the distal end 810 of the introducer 800. For example, the introducer 800 may be a sharp tip introducer configured to pierce the skin 802 of the patient. In various embodiments, the introducer 800 advantageously provides electrical isolation for the needle 115 such that there is no further need to add an electrical insulative coating to the needle 115. Accordingly, the needle 115 may not include an insulating dielectric coating or the like.

According to some embodiments, the needle 115 maintains intimate contact with the introducer 800 to minimize thermal insulation effects.

According to at least some embodiments, the introducer 800 may be a 20 G cannula (e.g., an introducer needle). The introducer 800 may include a curved or straight tip. For example, in some embodiments, the introducer 800 may include a 10 mm curved tip. In further embodiments, the introducer 800 may be coupled to an off-the-shelf (OTS) PENS. According to various embodiments, a position and placement of the introducer 800 may be confirmed in a manner known in the art such as through fluoroscopic means, ultrasound, or any standard of care imaging technology, or using a nerve stimulator or the like.

An ice ball 806 may be formed at the distal tip 808 of the needle and along at least a portion of the distal end 810 of the introducer 800, as shown in FIG. 8. According to exemplary embodiments, the ice ball 806 may be 16.6 mm in length (along the introducer 800) and 7.5 mm in width (along an axis perpendicular to the introducer 800). According to at least some embodiments, the center of the ice ball 806 may be formed greater than or equal to 3.0 mm proximal from the distal tip 808 of the needle 115. The ice ball 806 may form a teardrop shape, according to some embodiments, although the ice ball 806 may appear more rounded depending on the depth of the insertion of the introducer 800 and/or the rate of cryogen flow toward the distal tip 808 of the needle 115. For example, a relatively faster flow rate forms a longer ice ball 806 compared to a relatively slower flow rate. A longer ice ball 806 may be desirable for various applications, for example, when the target tissue includes an SI joint, and nerves associated therewith.

Figure 9:
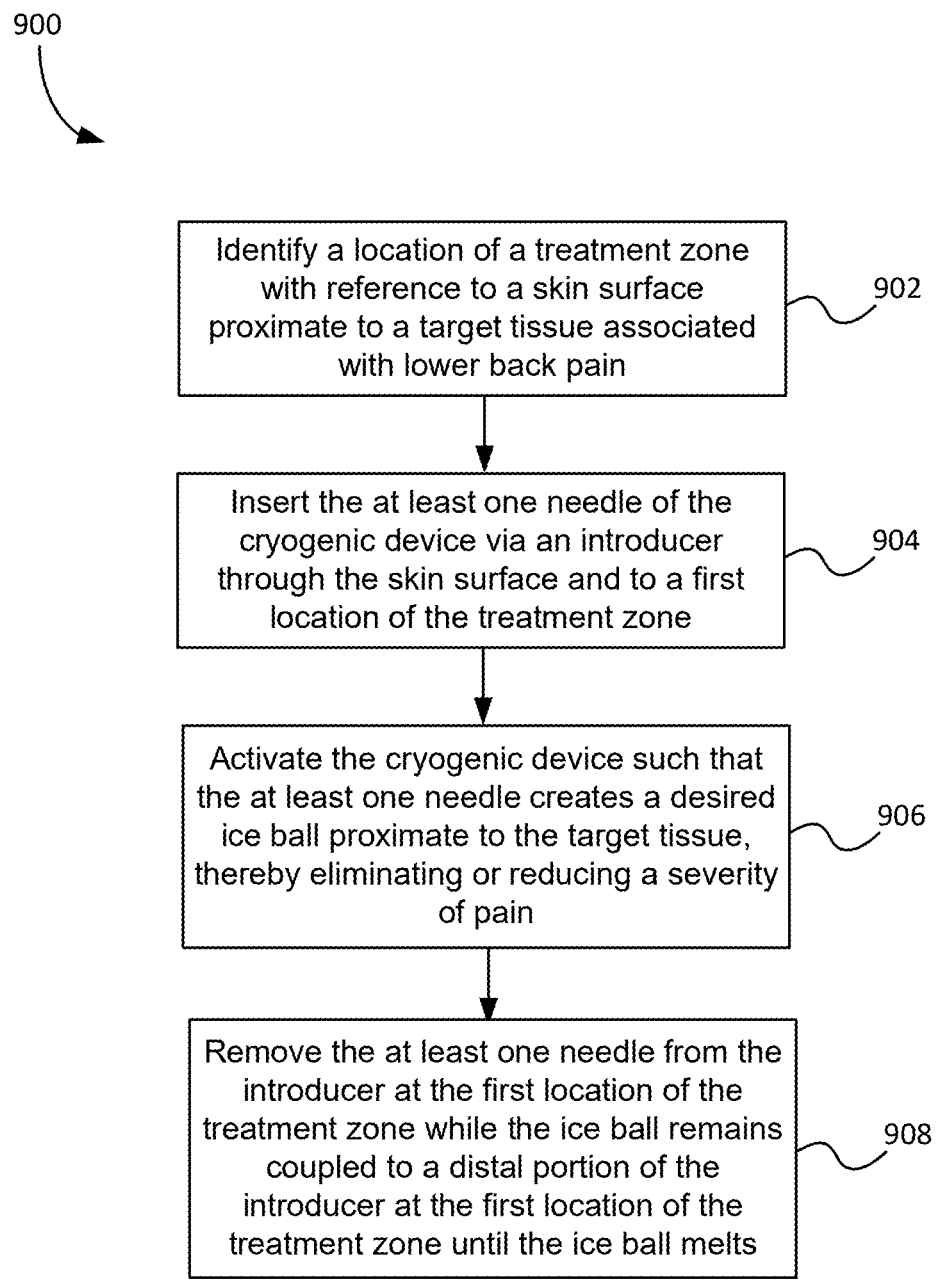
FIG. 9 is a flowchart of a method of treating lower back pain experienced by a patient, according to embodiments of the present disclosure.

FIG. 9 is a flowchart of a method of treating lower back pain experienced by a patient. Although method 900 is described primarily with respect to the treatment of lower back pain, method 900 and systems described herein may be applied to a variety of applications such as treatments to BVN, SI joints, sciatic nerves, radiculopathy, nerve compression syndrome, herniated discs, neuropathy, spinal stenosis, degenerative disc disease, spondylolisthesis, spinal osteoarthritis, spasticity, etc., including any other application and/or treatment zone described herein. Method 900 includes a method for treating lower back pain experienced by a patient using a cryogenic device including at least some of the embodiments described herein. For example, the cryogenic device may include a needle probe having at least one needle, the at least one needle having a proximal end, a distal end, and a needle lumen therebetween. The needle may be configured for insertion proximate to a location of a target tissue associated with lower back pain (or any other application described herein). The needle may further include a cooling fluid supply lumen extending distally within the needle lumen to a distal portion of the needle lumen and a cooling fluid source couplable to the cooling fluid supply lumen to direct cooling fluid flow into the needle lumen.

Method 900 further includes step 902 including identifying a location of a treatment zone with reference to a skin surface proximate to target tissue associated with lower back pain. In various embodiments, the nerve and/or the target tissue may include a BVN, a medial branch nerve, or any of the nerves described herein. According to various embodiments described herein, a PENS device and/or anatomical landmarks may be used to pre-locate a target nerve or otherwise generally locate a target nerve. In yet further embodiments, fluoroscopy in addition to other imaging techniques such as ultrasound or the like, may be used. In some embodiments, determining the location of the treatment is performed using neurostimulation by stimulating the nerve with an electrically conductive surface of the at least one needle.

Step 904 includes inserting the at least one needle of the cryogenic device via an introducer through the skin surface and to a first location of the treatment zone. Step 904 may include positioning an introducer (e.g., a cannula) to create an access site within tissue where the introducer defines a tubular member having a lumen and extending between a proximal end and a distal end of the introducer. The tissue may include spinal tissue beneath a skin surface and a branch nerve proximal to a spine of the patient. Inserting the at least one needle of the cryogenic device probe assembly via the introducer through the skin may include inserting the at least one needle until the proximal end of the at least one needle is flush with a proximal end of the introducer. For example, the at least one needle may be advanced distally through the lumen of the introducer to position the distal tip of the at least one needle adjacent to the nerve. Step 904 may include conducting percutaneous nerve localization (e.g., using a PENS) to determine whether the needle and/or introducer is proximal to the target nerve. If the nerve localization using percutaneous nerve stimulation is unsuccessful, the needle and/or introducer may be repositioned within the tissue. Thereafter, percutaneous nerve localization may be conducted again to determine whether the repositioning successfully places the needle and/or introducer sufficiently proximal to the target nerve.

Step 906 includes activating the cryogenic device such that the at least one needle creates a desired ice ball proximate to the target tissue, thereby eliminating or reducing a severity of pain. For example, the cryotherapy probe may be activated to deliver the cooling therapy and create an ice ball about the distal tip of the blunt needle and/or along the distal portion of the introducer, as shown and described with respect to FIG. 8. According to at least some embodiments, activating the cryogenic device includes increasing the flow rate of the cryogen through the needle. The flow rate may be 925±5 ml/min.

Step 908 further removing the at least one needle from the introducer at the first location of the treatment zone while the ice ball remains coupled to a distal portion of the introducer at the first location of the treatment zone until the ice ball melts. For example, the introducer may remain within the target tissue and the ice ball remains coupled to the introducer inserted into the skin until the ice ball melts. The cooling time for the ice ball may be between 70±5 seconds and the post-cooling time may be 15±5 seconds such that the total treatment time for each location in the target tissue is between 86±5 seconds. Accordingly, while the ice ball melts at a first location, a health care professional may restart the process at a second location using the blunt tip needle and another introducer, if necessary. This sequential process aids in decreasing overall treatment times by reducing down time between treating a plurality of locations. Embodiments of the present disclosure enable up to a 20% reduction in treatment time as compared to other treatment options.

Method 900 may include removing the introducer from the treatment zone after a predetermined period of time and inserting the at least one needle of the cryogenic device probe assembly via the introducer through the skin and into a second or subsequent location of the treatment zone. The cryogenic device may be activated such that the at least one needle creates a second or subsequent ice ball about the nerve, thereby eliminating or reducing the severity of pain. Accordingly, the at least one needle may again be removed from the introducer (the same introducer or a different introducer) and the treatment zone after treatment. The ice ball remains coupled to the introducer inserted into the skin until the second or subsequent ice ball melts.

The ratio between the inner diameter and the outer diameter of the needle as described herein at least partially enables the ice ball to remain coupled with the distal portion of the introducer as the needle is removed such that the ice ball may remain within the patient as a different location in the target tissue is treated. The inner and outer diameter may be increased or decreased (while maintaining the ratio therebetween) for altering the size of the ice ball depending on the intended application. If the ratio between the inner diameter and the outer diameter of the silica tubing 314 that provides the cryogen fluid pathway, is not properly tuned, the ice ball forms abnormal or unexpected shapes that are not conducive to treating a nerve within the target tissue. For example, the ice ball may become asymmetrical or otherwise irregularly shaped.

Figure 10:
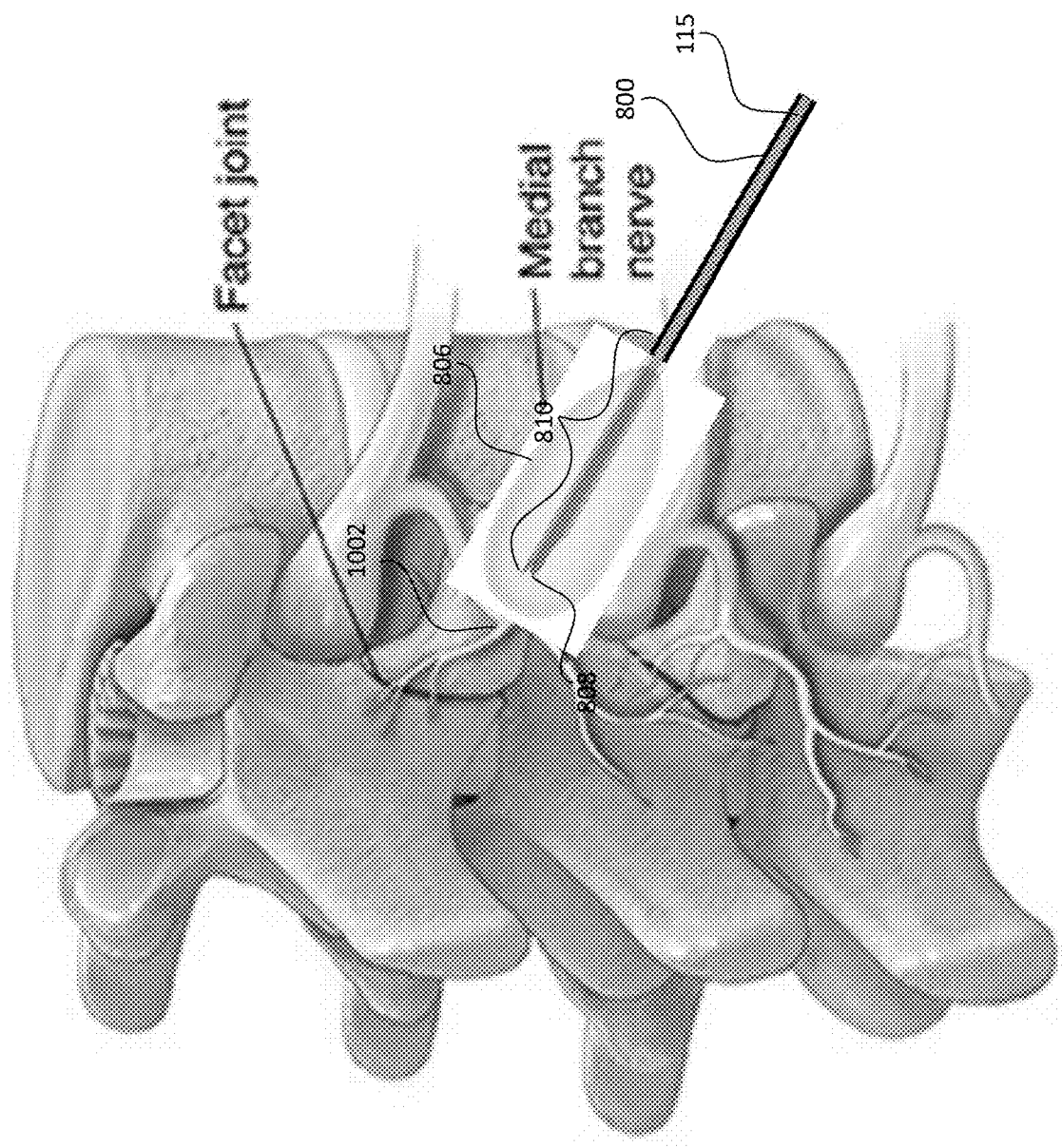
FIG. 10 illustrates an anatomical diagram showing an exemplary target tissue and treatment location, according to some embodiments of the present disclosure.

FIG. 10 illustrates an anatomical diagram showing an exemplary target tissue and treatment location. As can be understood with reference to FIG. 10, the needle 115 may be thermally coupled to a target nerve 1002, in this case, a medial branch nerve, by positioning the needle 115 in proximity to a spinal cord adjacent the epidural space, to a branch nerve from the spinal column in or adjacent a vertebral foramen to a herniated disk, or to another target neural and/or spinal tissue. Verification of positioning may be provided using an electro-myographic system (EMG) as described above, and/or positioning may optionally be guided using fluoroscopy, ultrasound imaging, and/or other imaging modalities. Treatment may be applied according to various embodiments described herein, including embodiments described at least with respect to method 900 of FIG. 9.

Figure 11:
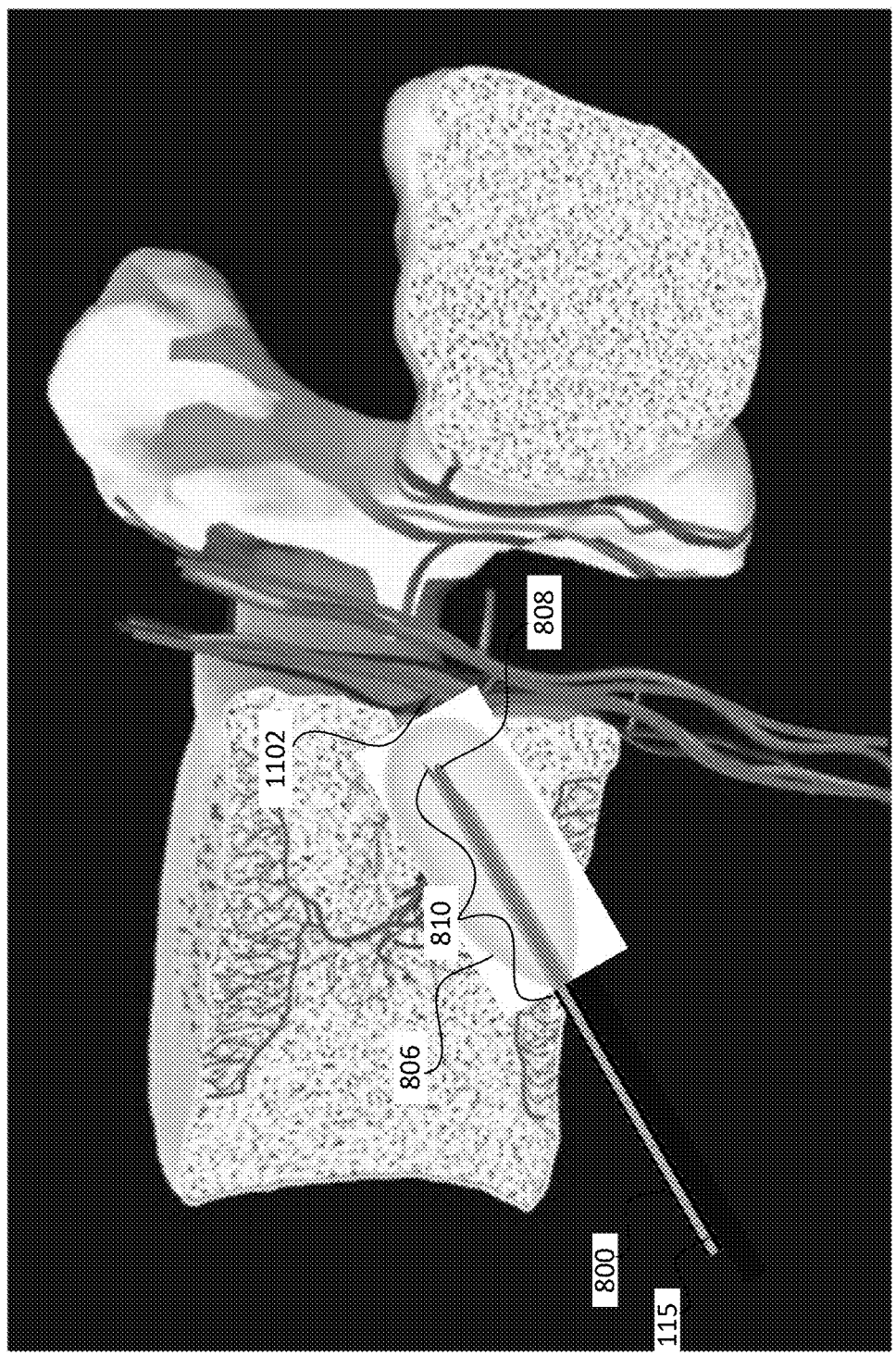
FIG. 11 illustrates an anatomical diagram showing an exemplary target tissue and treatment location, according to some embodiments of the present disclosure.

FIG. 11 illustrates an anatomical diagram showing an exemplary target tissue and treatment location. Similarly, as in FIG. 10, the needle 115 may be thermally coupled to a target nerve 1102, in this case a BVN, by positioning the needle 115 between the discs and/or endplates of the vertebrae of the spine.

One or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including but not limited to application-specific integrated circuits, field programmable gate arrays, or the like. Combinations of computer-executed software and hard-wired logic or other circuitry may also be suitable.

Embodiments of the methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the at least one computer to implement one or more embodiments of the methods of the present subject matter. Additionally, or alternatively, the computing device(s) may comprise circuitry that renders the device(s) operative to implement one or more of the methods of the present subject matter.

Any suitable computer-readable medium or media may be used to implement or practice the presently-disclosed subject matter, including but not limited to drives, and other magnetic-based storage media, optical storage media, including disks (e.g., CD-ROMs, DVD-ROMs, variants thereof, etc.), flash memory, RAM, ROM, and other memory devices, and the like.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below.

The subject matter of embodiments of the present invention is described here with specificity, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A cryogenic device for treating a target tissue of a patient, the device comprising:
- a handpiece having a size and shape suitable for supporting in a hand of an operator, and at least one cooling fluid supply path disposed in the handpiece; and
- a needle probe coupled to a distal portion of the handpiece, the needle probe comprising:
- a probe body;
- a blunt needle coupled to the probe body, the blunt needle comprising a proximal end, a distal end, and a needle lumen therebetween; and
- a silica supply tube extending within the needle lumen and coupled to the at least one cooling fluid supply path, the silica supply tube comprising an inner diameter and an outer diameter, wherein a ratio of the inner diameter to the outer diameter of the silica supply tube is configured to provide a desired ice ball shape, wherein the inner diameter is configured to enable formation of the desired ice ball shape, wherein the outer diameter is configured to provide exhaustion space within the needle probe.

2. The cryogenic device of claim 1, wherein the desired ice ball shape is a teardrop shape.

3. The cryogenic device of claim 1, wherein the ratio of the inner diameter to the outer diameter the silica supply tube is between 0.756 and 0.85.

4. The cryogenic device of claim 1, wherein a flow rate of cooling fluid is further configured to provide the desired ice ball shape at the distal end of the blunt needle.

5. The cryogenic device of claim 1, wherein a gauge of the blunt needle is greater than or equal to 25 G.

6. The cryogenic device of claim 1, wherein the blunt needle is greater than or equal to 175 mm in length.

7. The cryogenic device of claim 1, wherein the target tissue comprises a medial branch nerve.

8. The cryogenic device of claim 1, wherein the target tissue comprises a sacroiliac joint.

9. The cryogenic device of claim 1, wherein the target tissue comprises a basivertebral nerve.

10. The cryogenic device of claim 1, wherein at least a portion of the blunt needle is electrically conductive for performing neurostimulation and identifying the target tissue.

11. The cryogenic device of claim 1, wherein the blunt needle does not include a dielectric coating.

12. The cryogenic device of claim 1, further comprising a needle guard configured to house the needle probe.

13. The cryogenic device of claim 1, further comprising an access cover configured to seal internal ports of the cryogenic device.

14. A cryogenic device for treating a target tissue of a patient, the device comprising:
- a handpiece having a size and shape suitable for supporting in a hand of an operator, and at least one cooling fluid supply path disposed in the handpiece; and
- a needle probe coupled to a distal portion of the handpiece, the needle probe comprising:
- a probe body;
- a blunt needle coupled to the probe body, the blunt needle comprising a proximal end, a distal end, and a needle lumen therebetween, wherein the blunt needle has a length greater than or equal to 175 mm and a gauge that is greater than or equal to 25 G; and
- a silica supply tube extending within the needle lumen and coupled to the at least one cooling fluid supply path, the silica supply tube comprising an inner diameter and an outer diameter, wherein a ratio of the inner diameter to the outer diameter of the silica supply tube is configured to provide a desired teardrop ice ball, wherein the inner diameter is configured to enable formation of the desired teardrop ice ball shape, wherein the outer diameter is configured to provide exhaustion space within the needle probe.

* * * * *